United States Patent Office 3,156,120
Patented Nov. 10, 1964

3,156,120
AUTOMATIC SAMPLING SYSTEM
Mitchell J. Kowynia, 104 Manchonis Road,
North Wilbraham, Mass.
Filed May 16, 1962, Ser. No. 195,202
2 Claims. (Cl. 73—421)

The present invention relates generally to sampling apparatus and has for its object to provide means for obtaining a sample or samples and preferably a truly representative sample or samples from granular material in motion or in transit as for instance, in any apparatus for handling granular materials generally, such as a bag filling apparatus.

Stated in another way, one principal object accomplished by my invention is the provision of a sampling system which may, over a period of time, incrementally accumulate a composite sample from a material-carrying conduit in direct proportion to the volume of material passing therethrough, for purposes frequently desirable and sometimes even mandatory, of analysis, quality control, and the like.

It will be helpful to an understanding of my invention first to briefly consider some of the essential points and more important features and aspects thereof and of the prior art, so that same may be kept in mind during subsequent reading of the detailed description of the practical embodiments of my improvements and illustrations thereof in the hereunto annexed drawings.

One broad aim of the instant invention is to improve over the commonly referred to "thief" method frequently employed in extracting samples. The procedure usually involved in this "thief" method of obtaining test samples consists of inserting a sampling device into the contents of a shipping drum so that upon withdrawal thereof a representative portion is taken from the drum for test purposes, analysis, etc. Such method has however proved unsatisfactory since, as has been found to be the case, whether a sample from a single drum or samples are taken from several drums and mixed together, the sample is not a faithful and average sample of the whole production run because the material in one drum may vary considerably in proportion of sieve size, etc., relative to the material in a second drum of the same production run.

The need of an inspector being in attendance for the entire period of time required to complete a production run is an important factor which militates against the method of sampling alluded to above.

The method and apparatus contemplated by this invention comprehends employment to advantage in any operation wherein it is desired to obtain a sample or samples of material being deposited in a container or the like simultaneously with the depositing operation, and more especially wherein it is desired to either continuously or intermittently sample over varied and predetermined periods of time, and according to a further feature of the invention such sample or samples is/are truly proportional in quantity to the total volume of the material being moved and representing the production run.

The device herein described may be referred to in one way as a composite sampler. A composite sample taken thereby may be defined as one obtained by combining uniform quantities of material from the body to be sampled, the quantities being obtained at regularly spaced time intervals. Heretofore, the obtaining of composite samples has been almost always an onerous and expensive task and one inherently tending to produce inaccurate results, such inaccurate results stemming from the usual human frailties and further from the time intervals involved between obtaining the several individual samples.

Hereby, a more accurate and less expensive composite sample can be obtained by using a sampling device which is designed to function continuously and automatically for the entire duration of the cycle and to gradually amass the desired sample. This is especially desirable where it is desired to make a composite sample accumulated of increments taken intermittently over a period of time so as to be truly representative of the yield of a continuing operation, as I have found that where the rate of flow, pressure, and composition have any tendency to vary, individually or collectively, from moment to moment, common sampling devices do not gather successive increments that are truly proportional to the quantity of material flowing through the line as the sampling ensues.

As envisioned herein, in certain instances, a proportional sample may not be required, in which instance, it may only be essential to arrange for a regular intermittent extraction, as a sample, of a predetermined or haphazard quantity. Contrariwise, in those instances where proportional samples are a desideratum, the amount extracted may be varied to be proportional to the volume moving, by varying either the quantity of each extraction or the frequency thereof.

Without intending to place undue limitations upon the scope of the invention beyond what may be required by the state of the prior art, the particular embodiment may be briefly described in one way as embracing the concept of an air operated sampling mechanism which alternates between drawing samples by suction into a sample bin or vessel and discharging same therefrom.

Another important consideration hereof is that uses are envisioned herewith whereby samples can be metered into the apparatus hereof for discharge directly into an integral or associated instrument for making a desired measurement upon the sample, wherefor the apparatus has utility in any analytical technique wherein measured test samples are introduced into the said integral or associated instrument.

It is another primary object of the present invention to provide a system and apparatus for obtaining such samples of a powdered material being deposited in bags or other containers simultaneously with the bag or container-filling operation, which system and apparatus comprehends the use of air pressure to create a vacuum within the sampling mechanism whereby the powder to be sampled is drawn by suction from the source of supply (i.e. a bag-filling machine) into the sampling mechanism and may be subsequently automatically discharged therefrom for the test purposes to follow.

One salient object of the instant invention is to teach a sampling device which will amass continuously increments of the material until a desired sample is obtained.

As a further refinement, I provide herein a disclosure of a sampling device which functions in such manner that the rate of inflow of the material into the sampler can be controlled according to a time-volume of sample relationship, and can be made constant or varied, as may be desired.

The invention is particularly advantageous in that it provides a sampling system which is self-clearing so as to avoid possible contamination of or by subsequently drawn samples.

Conceivably, the invention hereof may be used with other than bag filling apparatus or the like when the material is in transit, as for example, bulk containers, such as tanks where it is commonly necessary to obtain samples of the contents from time to time, and it is desirable that this be accomplished without undue inconvenience. It is also desirable that the attaining of samples be under such conditions that accurately representative samples of the material be obtained. It is further desirable that it be possible to perform sampling operations without waste or spilling. In accordance with the present invention, such desired standards may be obtained, and in addition it becomes possible to sample materials which may be in very wide range, both as to composition and specific gravity, and also importantly as to temperature. And withal, the equipment is versatile in its applicability to bulk containers of wide range, and involves relatively simple equipment.

A still further object is to provide a sampling device comprised of a system which in part is strategically disposed within the hopper or discharge spout of a bag-filling mechanism or the bulk container or tank, as the case may be, and in part is outside thereof, which together can extract the sample or samples and regulate the consequent amassing thereof, all by utilization of a pneumatic control system so as to substantially eliminate any danger of fire or explosion, hazards which are aggravated where the use of sampling devices of an electrical nature are contemplated.

For further comprehension of the invention and the characteristic features which I consider to be novel therewith as to its construction and organization and method of operation, I refer to the following detailed description forming a part of this specification, when read in conjunction with the illustrations in the accompanying drawings, wherein like characters of reference are employed like to designate like or corresponding parts throughout the several views and in which.

In the following description and in the appended claims, various components and details thereof will be identified by specific names for purposes of convenience. Although specific terms and expressions are employed for purposes of identifying various components, the phraseology and terminology are not for the purpose of limitation and are intended to be as generic in their application as the art will permit.

While the sampling mechanism hereof will be described with particular reference to the sampling of dry powders or granulated or fluidized materials, it will be appreciated that the apparatus may be utilized in situations wherein it is desired to take representative samples of liquids or other materials for the analysis thereof.

The sampling mechanism of the invention will be so constructed and arranged as to permit firstly the taking of a sample or samples as the filling operation from the source of supply ensues, and secondly, the withdrawing of the sample or samples so obtained for removal to any other location, as for testing purposes or the like.

In essence, the sampler alternates between exhausting samples into the sample bin for collection purposes and discharging same therefrom for test purposes.

Figure 1:
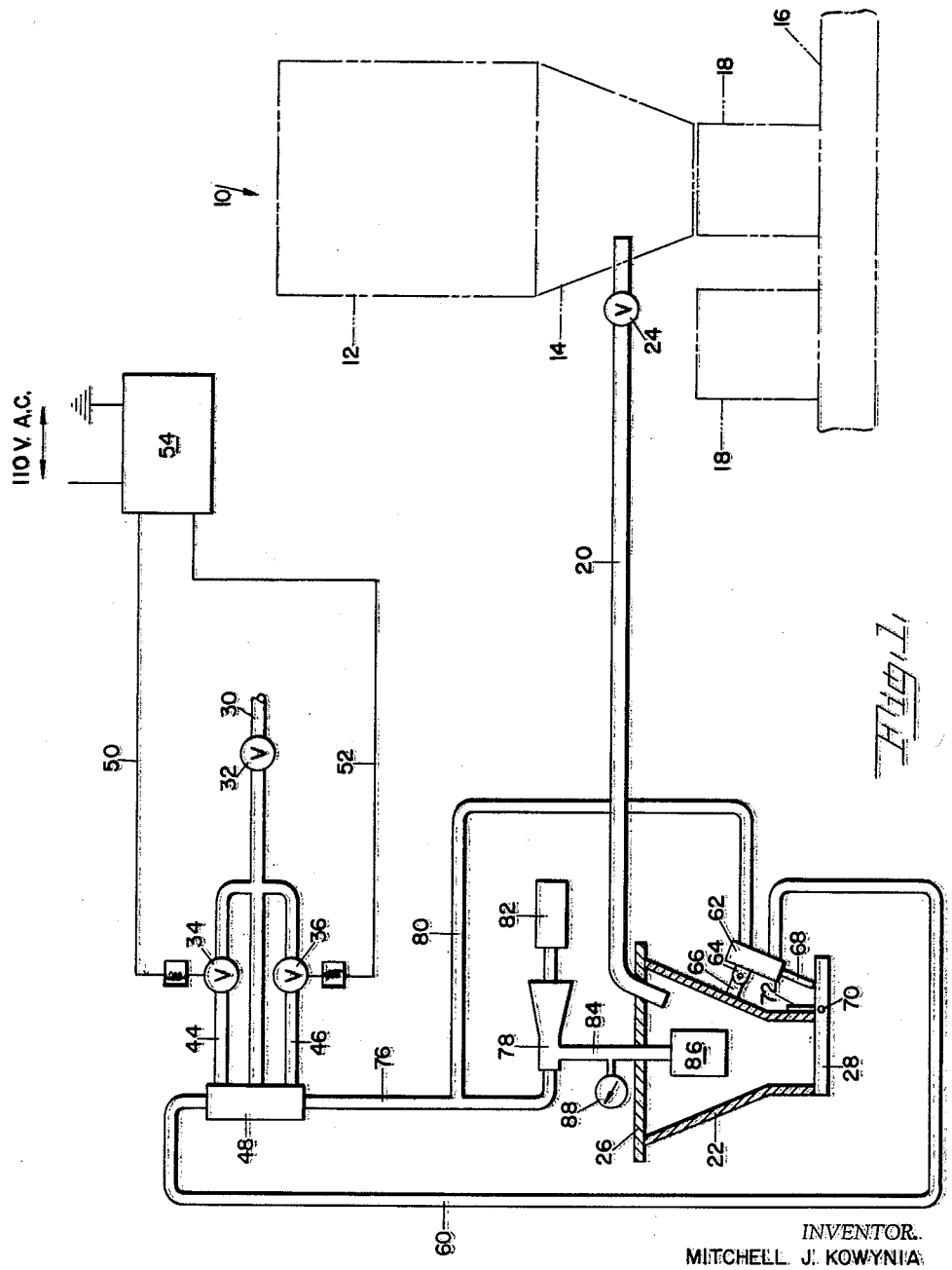
FIG. 1 is a schematic view of an automatic sampling apparatus constructed in accordance with the principles of the invention, the mechanism being shown in cooperative relationship with a bag filling machine.

In the preferred embodiment of the invention shown in FIG. 1, the sampler is shown in combination with a bag filling machine and conveyor, these last being shown in phantom, they forming no part of the persent invention. This bag filling machine per se may be of a suitable known construction which automatically feeds measured amounts of powdered or granulated materials into containers or bags moving in timed relationship by and upon a suitable conveying means so as to be disposed in seriatim below the discharge spout thereof.

Apparatus of this type comprise usually a tank of substantial height wherein the powdered or granular materials are placed into a fluid-condition with currents of air or other gaseous fluidizing media, a discharge spout at the lower end of said tank over which the filling snout of the bag is engaged and through which the fluidized mass of powdered or granular material flows into the bag and a control mechanism by means of which the spout may be opened or closed.

As is conventional, the bag filling mechanism may be inclusive of various mechanical subassemblies, such as a means for effectuating the continuous weighing of the bag upon a scale supporting the bag in material receiving position as it is being filled in manner so that, when a desired weight of material has been deposited in the bag, the scale will automatically activate a control system to actuate a power cylinder or equivalent to close a valve assembly or the like, all so as to stop the flow of material through the spout, which actuating means may, if desired, be so connected with the sampling mechanism hereof as to effect its operation.

I have shown in phantom, in FIG. 1, a bag filling machine generally indicated by 10 and inclusive of a suitably supported supply hopper or tank 12 having a downwardly-directed filling spout structure 14 connected thereto and depending therefrom and overlying a conveyor 16 having a capacity for supporting a plurality of bags, barrels or other containers 18. The bags 18 will usually be moved in seriatim by said conveyor 16 to the filling below said spout structure 14 in timed sequence with the intermittent discharge of the fluidized material from the supply hopper 12, all as is known and conventional.

The composite and continuous sampling mechanism of the invention will be disposed adjacent the bag filling machine 10 and will be communicative therewith via a suitable sampler conduit 20 which will be provided with an entrance end extending into the spout structure 14 of the bag-filling machine 10 and with an exhaust end extending into a sample bin or sample vessel or sample accumulator 22.

The material to be sampled will be drawn off from the bag-filling machine 10 during each bag-filling sequence through said sampler conduit 20 to said sample bin 22 by a vacuum or suction means, subsequently to be described.

That is to say, by means of the system hereof, representative samples may be withdrawn from the hopper of the bag filling machine at predetermined intervals by an automatically controlled vacuum or suction, simultaneously or concurrently with the bag filling operation, said vacuum or suction being applied to the sample bin through a means, to be described, and serving to draw into and through sampler conduit 20 samples at a predetermined rate, the amount of vacuum or suction necessary for a specific operation depending of course, upon a multiplicity of factors.

The sampler conduit 20 preferentially, though not obligatorily, may be provided with a shut off or pinch valve 24, of conventional design, interposed therealong, wherefore the sampler conduit may be closed off, or in cases where the sampler conduit comprises a resilient hose or equivalent, may be pinched or squeezed to block flow of the fluidized material therethrough and which may be operated intermittently to release the hose or to open the line temporarily to permit the flow of a material therethrough when and as desired and otherwise to pinch the hose or to close the line temporarily to deny the flow of a fluidized material therethrough also when and as desired.

In the sequential operation, the sample, conduit 20 will be flushed clean as the shut off or pinch valve 24 closes off said sample conduit by the displacing air wherefore contamination of a subsequent sample may be held to a minimum, a particularly desirable feature in certain instances.

The sample bin 22, as shown, may be of the vortex type and may comprise an inverted more or less truncated conical container having a top wall 26 integral with or hermetically secured to the top of said container, and a flapper valve or flap door 28 associated with the open ended bottom of said container in manner so as to effectuate a hermetical seal with the sample bin when in the normally closed position and so as to be actuated into the opened position periodically, in timed relation with other apparatus components, as will be hereinafter observed.

The sampler mechanism will be operated by air under pressure introduced to the system through an air supply conduit 30 from an external air supply source, not shown, same being of any conventional and well known type. A valve means 32 may be disposed in the conduit 30 for the usual and known control function and also for reducing the air pressure to that required for operation of the system, if such is desired.

The air entering the system through said conduit 30 will be understood to be and will be observed hereinafter to be capable of serving alternatingly, two functions: (1) it will create a vacuum in sample bin 22 so as to draw the material to be sampled from bag filling machine 10 and through sample conduit 20 into sample bin 22 in timed relationship with the operativeness of said bag filling machine; and (2) it will effectuate the opening of flapper valve 28 positioned at the open ended bottom or discharge end or mouth of sample bin 22 for the purpose of releasing the collected sample or samples therefrom.

In order to accomplish these ends, a pair of solenoid operated valves 34 and 36 are interposed in feeder air control lines 44 and 46 respectively, which feeder lines will lead from said air supply conduit 30 in spaced-apart relation and terminate at and be connected to the opposite extremities of a control or distribution valve 48, of conventional design so as to provide air pressure alternatingly to the top or bottom of said valve 48, as is known.

Solenoid operated valves 34 and 36 will each be connected by suitable circuit arrangements such as by connecting lines 50 and 52 respectively, to a control timer 54 of known design, with said control timer effectuating the alternate opening or closing of said solenoid valves at certain desired and predetermined intervals and in synchronism with the bag filling operations, said control timer being also connected by other suitable circuit arrangements (not shown) to the bag filling equipment.

The frequency of the alternating opening and closing of valves 34 and 36, and hence the sampling intervals, may be varied, according to operational demands, merely by making adjustments in the control timer, which adjustments are well understood by those who operate such equipment. Thus the control timer constitutes an adjustable or variable controller for controlling the solenoid operated valves to predetermined time intervals. To this end, the control timer may be electrically operated or it may be operated by a spring operated clock mechanism and may be of a type which operates on a cycle of certain duration, repeating the cycle as many times as desired so as to allow the obtaining of a composite sample of any desired size or over any desired period of time.

A flexible air conduit 60 is connected to and extends from one side of control valve 48 to one side of a conventional servo means 62 or the like which is disposed adjacent flapper valve 28 and is fulcrumed as at 64 to a bracket 66 fixed to a side wall of sample bin 22.

Air under pressure is admitted through control valve 48 by virtue of valve 34 being opened (and valve 36 being closed) so as to pass therefrom into and along air conduit 60 to actuate servo means 62 in manner to cause an operating finger or keeper 68 thereof to be retracted from its normally extended position of abutment with flapper valve 28 whereat it urges said flapper valve to be maintained in its closed position relative to the sample bin 22. Retraction of operating finger 68 allows flapper valve 28 to pivot relative to sample bin 22, upon its pivot pin 70 mounted in a bracket 72 fixed to a side wall of said sample bin.

It will be here explained that, with a vacuum within the sample bin, the flapper valve is held in the closed position.

It is to be appreciated that with flapper valve 28 pivoted to an opened or discharge position, collected material contained within sample bin 22 is thus allowed to drop through the discharge opening or mouth wherefor it may be captured in a suitable container, not shown, disposed therebelow.

A flexible air conduit 76 will be connected to and extend from the other end of control valve 48 to an air jet 78 disposed above sample bin 22, for purposes as will be observed. A flexible take-off conduit 80 may be connected into air conduit 76 above air jet 78 and be connected to the other side of servo means 62 wherefor the operating finger 68 is alternately influenced in a direction away from and toward the flapper valve 28.

Air in air conduit 80 will serve to actuate operating finger 68 of servo means 62 outwardly so as to maintain flapper valve 28 in closed position, thus precluding any unwanted or untimely release of material from sample bin 22.

Air in air conduit 80 will also pass to air jet 78 which preferentially, though not obligatorily, will have a conventional muffler 82 associated therewith. A vacuum is created at jet 78 thereby causing air to be exhausted from sample bin 22 through a filter 86 and a conduit 84 connected to jet 78, whereby may be created, within the closed sample bin, a vacuum having a capacity for inducing the material being sampled to be drawn off from bag filling machine 10 through sample conduit 20 and into the sample bin.

A vacuum gauge 88 may be disposed in conduit 84 for the usual control purposes, if desired.

Whether air is fed through air conduit 60 or conduits 76 and 80 is determined by the action of control timer 54 upon solenoid valves 34 and 36.

When control timer 54 actuates solenoid valve 34 to "on" position, solenoid valve 36 will be actuated to "closed" position, and vice versa.

When timer 54 opens solenoid valve 34, air is allowed to pass from air supply conduit 30 through control valve 48 and through line 60 to cause retraction of operating finger 68 of servo means 62 permitting flapper valve 28 to swing open, whereby material may be discharged through the discharge end or mouth of sample bin 22.

Contrariwise, when timer 54 opens solenoid valve 36, air is allowed to pass through conduits 76 and 80 to actuate air jet 78 and to close flapper valve 28 during the interval when a sample is being drawn from bag filling machine 10 through sample conduit 20 by the vacuum created in supply bin 22.

Timer 54 will continue to recycle in this manner indefinitely or until the desired number of samples are obtained, first actuating solenoid valve 36 to cause air to pass through control valve 48 and downwardly along conduits 76 and 80, and then shutting off solenoid 36 and actuating solenoid 34 so as to cause air to pass through control valve 48 along conduit 60.

Thus it will be appreciated that the sampler is allowed to take a sample or samples from the source of supply and then the sampler is opened to permit the withdrawal of the sample or samples so obtained, with the sampler alternating between the functions of taking samples into the sample bin and discharging same therefrom.

Through the use of air pressure, a vacuum is created within the sample bin so as to draw the material away from the source of supply into sample conduit 20 and outwardly thereof into sample bin 22.

It will, of course, be appreciated that control timer 54 may be preset for any required or desired time intervals whereby the sample bin may be completely filled or partially filled, all as may be desired for the specific sampling techniques envisioned.

It will also be understood that the operation of control timer 54 will be synchronized with the operation of the bag-filling machine so that samples are obtained from each bag being filled, if such is the desideratum.

Many modifications of the above described invention may be embodied and many equivalents of the respective elements of the sampling system may be used without departing from the spirit and scope of the invention.

Figure 2:
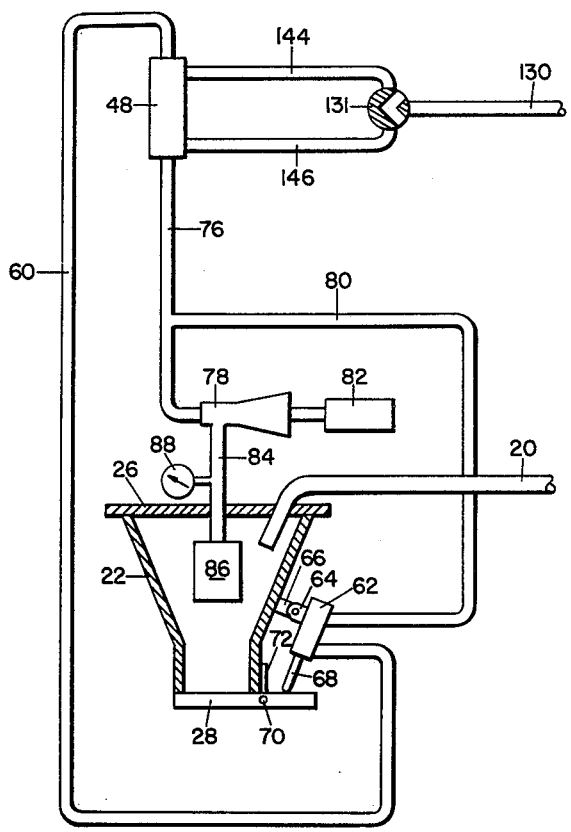
FIG. 2 is a schematic view of a modified form of the sampling mechanism of the invention.

In the form of the invention shown in FIG. 2, a two-way air valve is substituted for the timer and the solenoid valves of the preferred embodiment illustrated in FIG. 1.

The modified sampler shown in said FIG. 2 will be identical in all other respects to the preferred embodiment, wherefore new reference characters will be applied only where significant departures take place.

Air under pressure will enter the system, from an external source, not shown, through a conduit 130 having a two-way valve 131 disposed therealong. Feeder lines 144 and 146 will emanate from each side of two-way valve 131 and will terminate in control or distribution valve 48, previously described.

Two-way valve 131 may, if desired, be mechanically linked to the control mechanism of the bag filling machine, not shown in FIG. 2, whereby said two-way valve may be opened or closed with each filling cycle of said bag filling machine.

When two-way valve 131 is moved in one direction, air is permitted to pass through feeder line 144 and control valve 48 into conduit 60, thus releasing servo means 62 permitting flapper valve 28 to swing open.

When two-way valve 131 is moved in the opposite direction, air is permitted to pass through the feeder line 146 and control valve 48 into lines 76 and 80, thus actuating slide valve 62 to close flapper valve 28 and actuating air jet 78 to create a vacuum in sample bin 22 so as to induce the material to be sampled to be sucked from the bag filling machine through sample conduit 20 and into sample bin 22.

Thus, FIG. 2 illustrates a mechanical means for controlling the passage of air within the system, as opposed to the timer-controlled means shown in FIG. 1.

Figure 3:
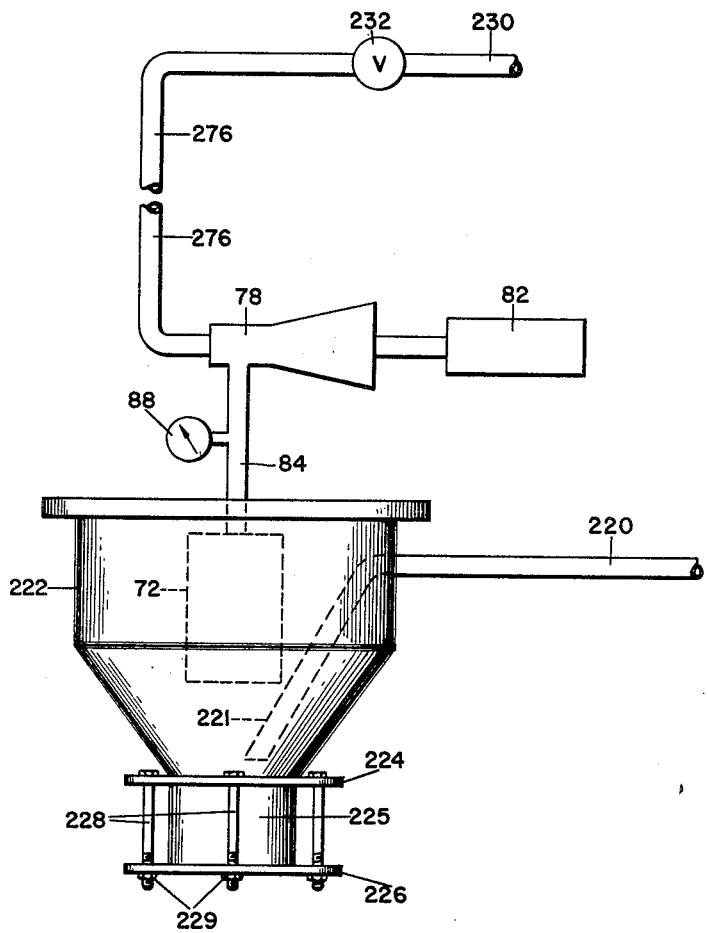
FIG. 3 is a schematic view of still another modified form of the sampling mechanism of the invention.

In FIG. 3 is illustrated still another form of the invention, wherein a stationary container is clamped to the discharge end of the sample bin.

This embodiment will be much simpler in its construction and will have application in those instances where continuous batches or samples are not required.

The sampler of FIG. 3 will comprise a sample bin 222, having a lowermost discharge end surrounded by a peripheral flange 224.

A removable container 225 will have its upper end disposable flush against said discharge end and will be clampable in position as by a retaining plate 226 embraceable against its lower or bottom wall portion, with elongated bolts 228, having nuts 229 threadedly engageable therewith, adapted to pass through said flange 224 and plate 226 to maintain container 225 in a fixed and stationary position.

Air under pressure will enter the system through a conduit 230 and pass through a suitable control valve 232 along a conduit 276 to air jet 78 having muffler 82 associated therewith. A vacuum is created at jet 78 thereby causing air to be exhausted from sample bin 222 through filter 72 and conduit 84 creating a vacuum in bin 222 to suck material from a supply source, not shown, into a sample conduit 220 and thence into sample bin 222.

In this instance, conduit 220 will have a downwardly extending extremity 221 which will be able to feed the material to be sampled directly into container 225.

Valve 232 may be manually controlled whereby an operator can draw the desired amount of material from the supply source, when and as required.

Alternatively, of course, valve 232 may be operatively connected to a bag filling machine whereby samples would be taken only at certain desired intervals.

From the foregoing, it will be obvious that I have provided a truly novel vacuum sampling device. It is believed that the gist of the invention will be clearly understood from the foregoing disclosure and accordingly, further analysis thereof at this point is considered unnecessary, as I have, in accordance with the provisions of the patent statutes, described the construction and principle of operation of my invention together with the apparatus which I believe to represent the best embodiment thereof, to the end that others can, by applying current knowledge, readily adapt it for various applications without omitting features which, from the standpoint of prior art, fairly constitute essential characteristics of its generic and/or specific aspects. The substitution of equivalents and other changes, modifications and alterations as circumstances may suggest or render expedient, are reasonably contemplated, the invention being susceptible of such without departing from its real spirit or underlying principles.

The claims are desired to include within the scope thereof all of said suitable variations, modifications and equivalents by which substantially the results of the invention may be obtained through the use of substantially the same or equivalent devices or means. Accordingly, limitation hereof should only be made as determined by a proper interpretation of the prior art and the scope of the subjoined claims, in which it is my intention to claim all novelty inherent herein as broadly as possible.

It should also be understood that while I have illustrated and described the preferred embodiments of my invention, I do not limit myself to the precise construction herein disclosed and the right is reserved to all changes and modifications coming within the scope of the invention as defined in any of the appended claims.

I claim:

1. A sampling mechanism for use with a bag filling machine having a material supply hopper comprising: a sampler bin having a discharge opening, a sampler spout extending between said sampler bin and the material supply hopper, a flapper valve for normally closing the discharge opening of said sampler bin, servo means for moving said flapper valve into and out of closing position relative to the discharge opening of said sampler bin, means for creating a vacuum within said sampler bin whereby material is drawn from the supply hopper through said sampler spout and into said sampler bin, a supply of pressurized air, an air supply conduit, a pair of feeder air control lines leading from said air supply conduit, a distribution valve connected to said air control lines, a solenoid operated valve in each said air control line, a control timer connected to each said solenoid operated valve, said control timer effectuating the alternate opening or closing of first one and then the other of said solenoid valves, air conduits leading from said distribution valve to said servo means and to said means for creating a vacuum within said sampler bin, whereby when one of said solenoid valves is opened pressurized air is delivered to said vacuum means to create a vacuum in said sampler bin and to one side of said servo means to close said flapper valve, and whereby when the other of said solenoid valves is opened pressurized air is delivered only to the other side of said servo means to open said flapper valve.

2. A sampling mechanism for use with a bag filling machine having a material supply hopper comprising: a sampler bin having a discharge opening, a sampler spout extending between said sampler bin and the material supply hopper, a flapper valve for normally closing the discharge opening of said sampler bin, servo means for moving said flapper valve into and out of closing position relative to the discharge opening of said sampler bin, means for creating a vacuum within said sampler bin whereby material is drawn from the supply hopper through said sampler spout and into said sampler bin, a supply of pressurized air, an air supply conduit, a pair of feeder air control lines leading from said air supply conduit, a two-way valve in said air supply conduit connected to said feeder lines and to said air supply conduit, means for moving said two-way vavle to close off one of said feeder lines when the other is opened, a distribution valve connected to said air control lines, air conduits leading from said distribution valve to said servo means and to said means for creating a vacuum within said samper bin, whereby when one of said feeder lines is opened and the other is closed off pressurized air is delivered to said vacuum means to create a vacuum in said sampler bin and to one side of said servo means to close said flapper valve, and whereby when the said other of said feeder lines is opened and the said one of said feeder lines is closed off, pressurized air is delivered only to the other side of said servo means.

References Cited in the file of this patent

UNITED STATES PATENTS

| | | |
|---|---|---|
| 1,056,254 | Brown | Mar. 18, 1913 |
| 2,353,828 | Hyde | July 18, 1944 |
| 2,584,106 | Batchelder et al. | Feb. 5, 1952 |
| 2,693,705 | Casler et al. | Nov. 9, 1954 |
| 2,968,948 | Rose | Jan. 14, 1961 |

OTHER REFERENCES

Dowd, A. A.: Hopper Design for Automatic Machinery, in Machinery, p. 38, Sept. 1924.